Figure 1:
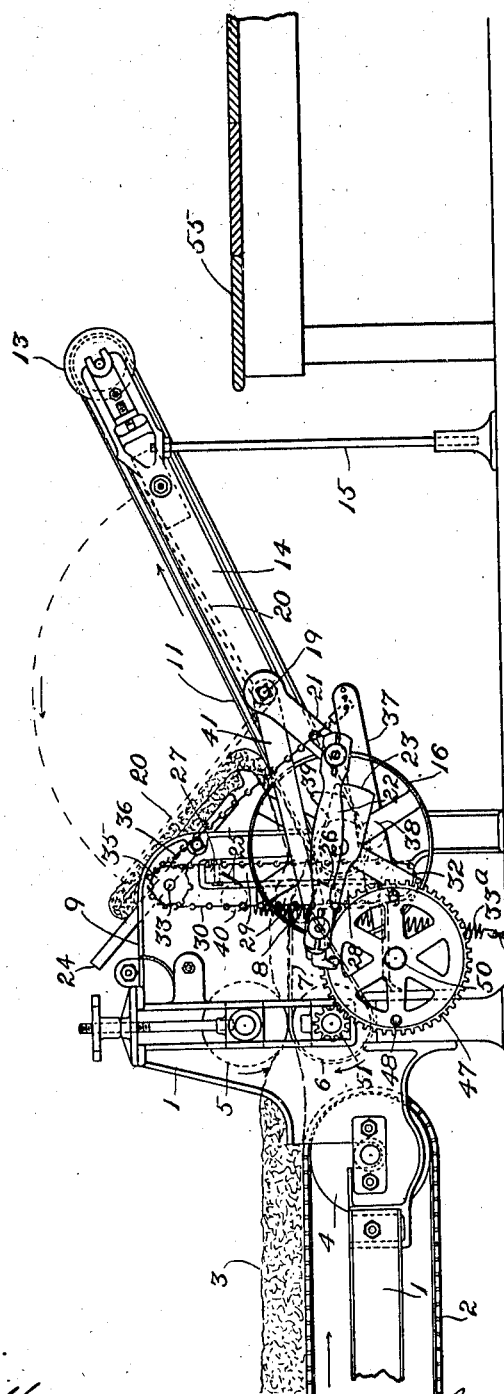

C. E. T. SCRIBNER.
MACHINE FOR MAKING BATS.
APPLICATION FILED SEPT. 7, 1911.

1,020,372.

Patented Mar. 12, 1912.
4 SHEETS—SHEET 1.

Witnesses:
Oscar F. Hill,
Edith A. Wiseman.

Inventor:
Charles E. T. Scribner
by Chas. F. Randall
Attorney.

C. E. T. SCRIBNER.
MACHINE FOR MAKING BATS.
APPLICATION FILED SEPT. 7, 1911.

1,020,372.

Patented Mar. 12, 1912.
4 SHEETS—SHEET 2.

Witnesses:
Oscar F. Hill
Edith A. Vreeman

Inventor:
Charles E. T. Scribner
by Chas. F. Randall
Attorney.

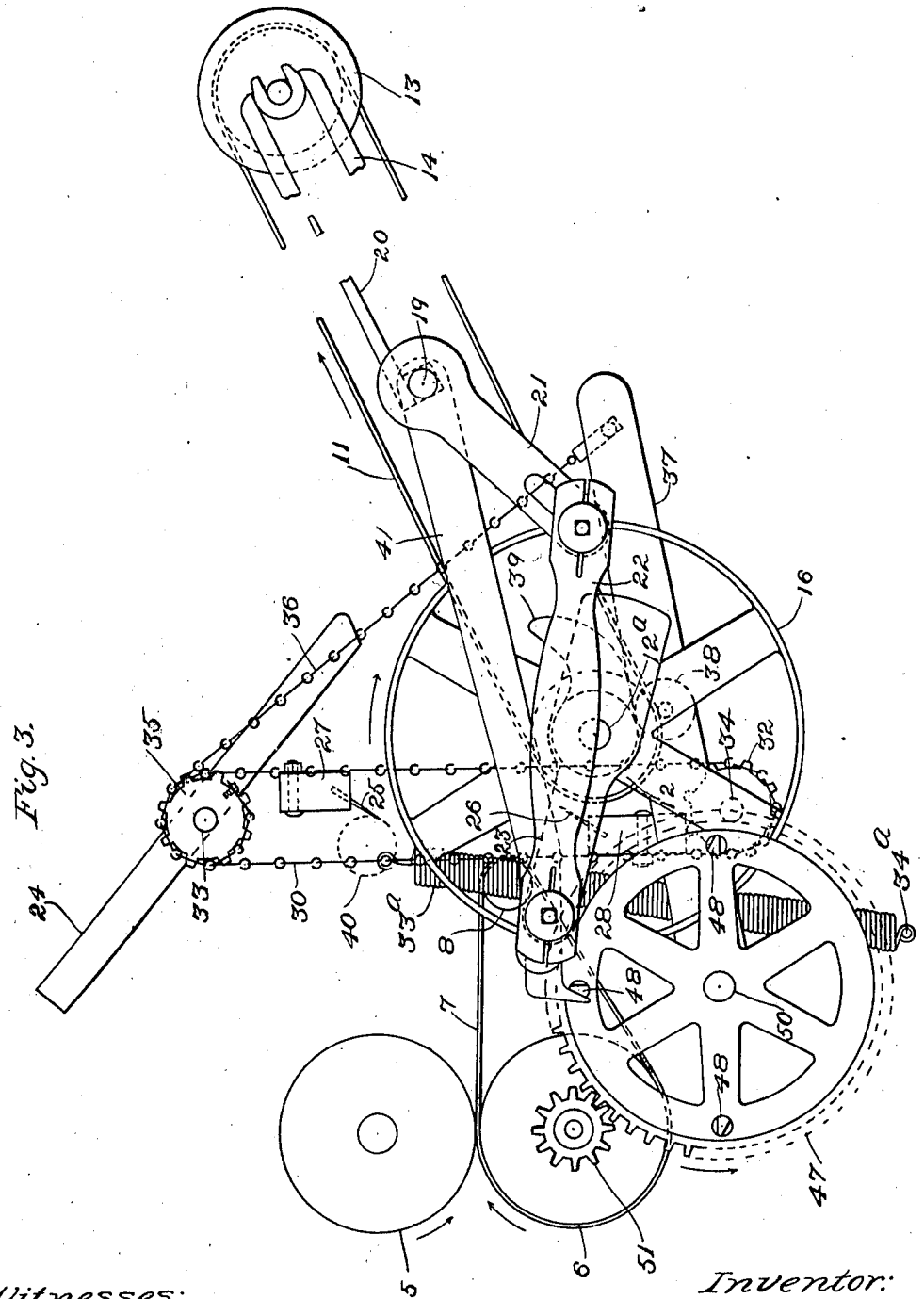

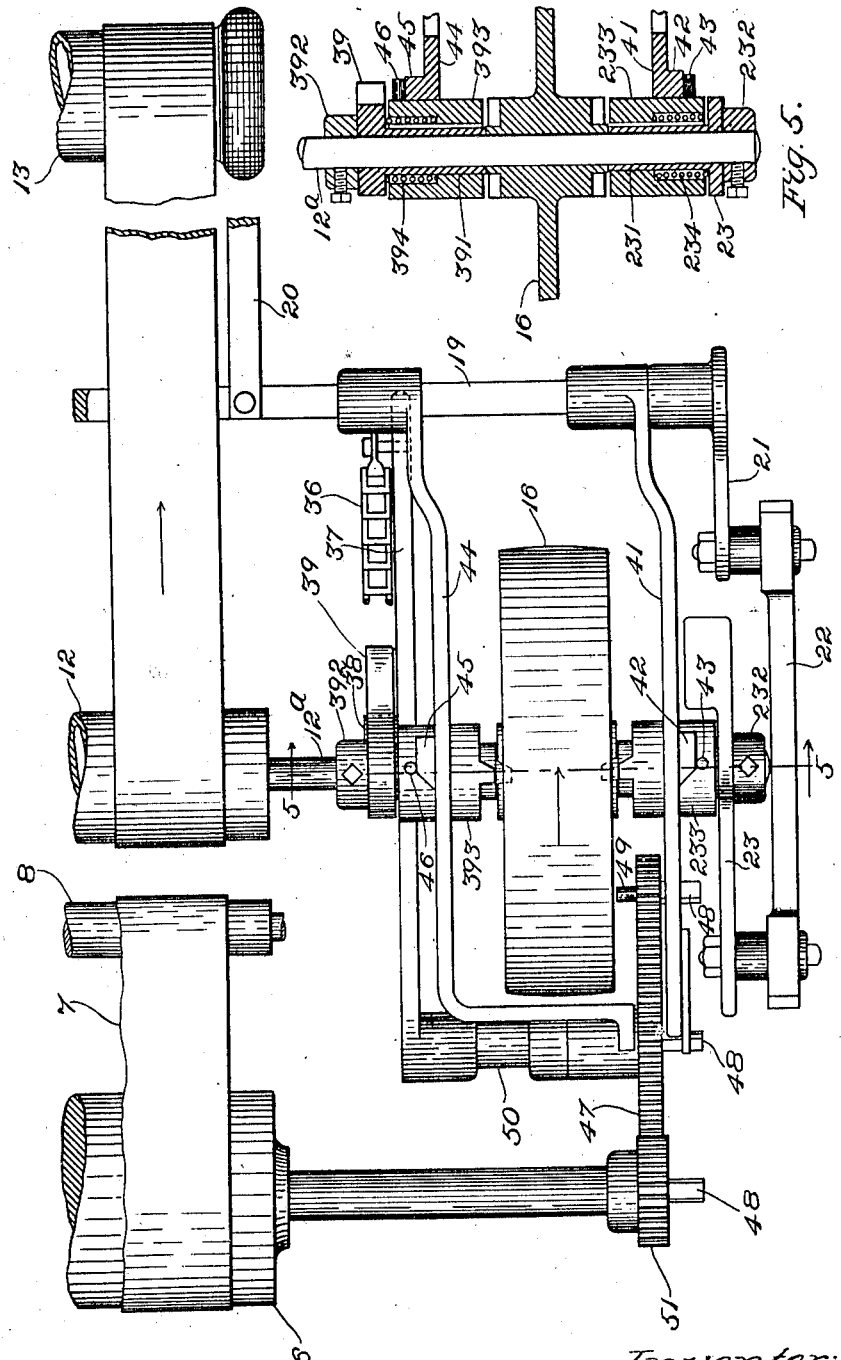

UNITED STATES PATENT OFFICE.

CHARLES E. T. SCRIBNER, OF NORTH ADAMS, MASSACHUSETTS, ASSIGNOR TO THE JAMES HUNTER MACHINE COMPANY, OF NORTH ADAMS, MASSACHUSETTS, A CORPORATION OF MASSACHUSETTS.

MACHINE FOR MAKING BATS.

1,020,372.  Specification of Letters Patent.  Patented Mar. 12, 1912.

Application filed September 7, 1911. Serial No. 648,186.

*To all whom it may concern:*

Be it known that I, CHARLES E. T. SCRIBNER, a citizen of the United States, residing at North Adams, in the county of Berkshire, State of Massachusetts, have invented a certain new and useful Improvement in Machines for Making Bats, of which the following is a specification, reference being had therein to the accompanying drawings.

The invention consists in a novel machine for making bats of fibrous material, such, for instance, as those which are employed in the manufacture of quilts; also, in certain novel combinations forming part of such machine. In the said machine I employ in combination with a moving conveyer for a lap of fibrous material, means for folding the lap upon itself in a plurality of folds while supported by the conveyer, and means for severing the lap into bat-lengths, each bat being delivered by the conveyer in a narrow folded state. The lap of fibrous material may be supplied by a lap-forming machine arranged to deliver to the moving conveyer aforesaid. The means for folding the lap upon itself preferably is contrived to fold the lap upon transverse lines by turning the foremost portion thereof back upon that which follows, and in its preferred form comprises a fly which turns back the leading portion of the lap as the latter advances with the lap-conveyer, and a support upon which such portion is received from the fly and from which it is delivered upon the succeeding portion on the moving conveyer, the turning-back being repeated until the material has been folded upon itself the required number of times.

An embodiment of the invention is illustrated in the drawings, in which latter,—

Figure 2:
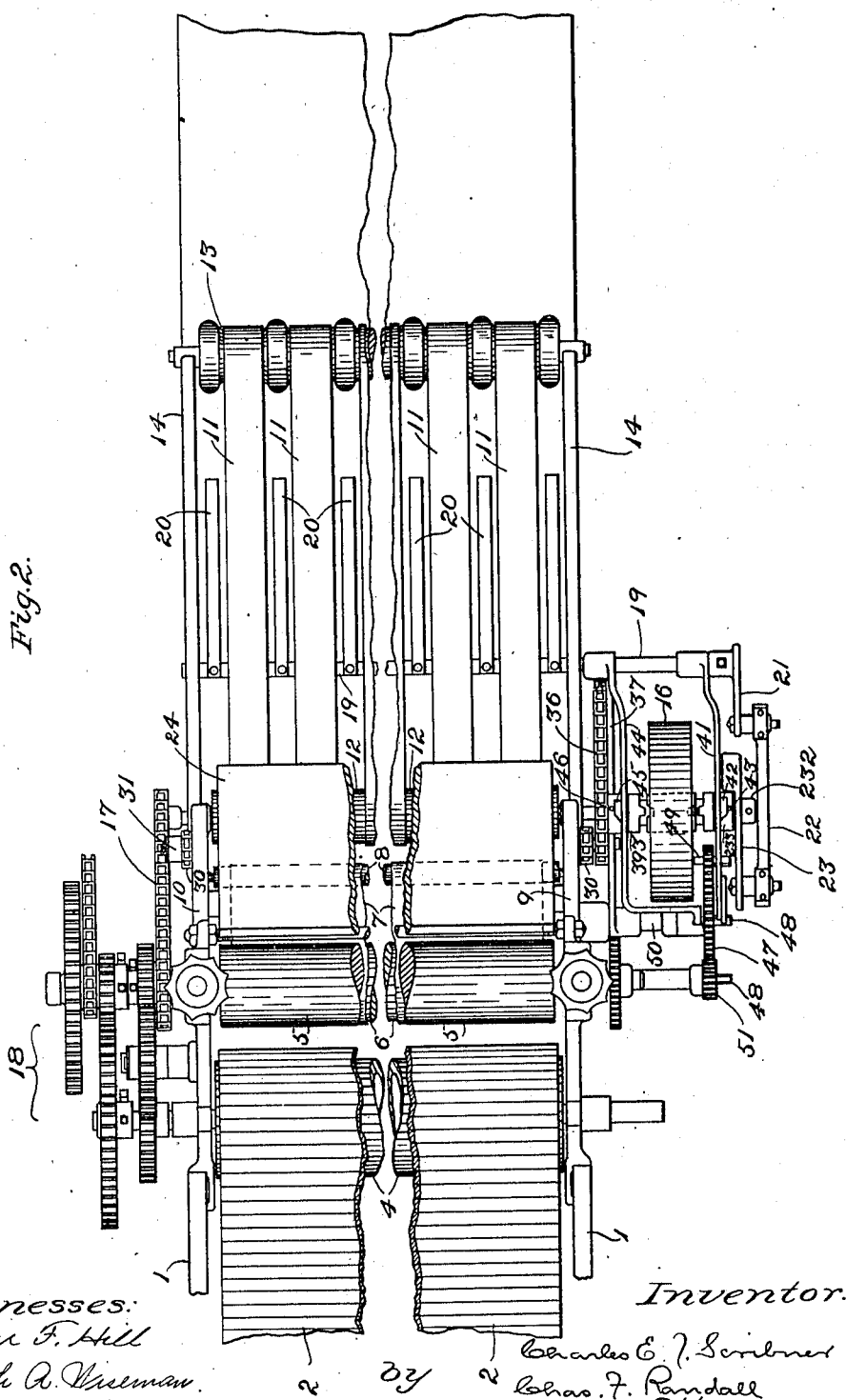

Figure 1 is a side elevation of a machine containing the said embodiment, showing a lap in process of being operated upon. Fig. 2 is a plan view of the said machine, the middle portion of the width of the machine being broken out to economize space, and the lap being omitted. Fig. 3 shows in side elevation, on an enlarged scale, the main working parts of the machine, omitting the lap-forming and feeding conveyer of Figs. 1 and 2. Fig. 4 is a plan of some of the details shown in Fig. 3. Fig. 5 is a detail view in section in the plane of line 5, 5, of Fig. 4.

Figs. 1 and 2 show certain parts at the delivery-end of a lap-forming machine, namely, portions of the frame 1 of such machine, a portion of the traveling endless slatted conveyer-apron 2 on which the lap 3, Fig. 1, is formed, a roll 4 journaled in bearings on frame 1 and by which the delivery-portion of said conveyer 2 is supported, and a pair of rotating rolls 5, 6, between which the lap passes from the conveyer 2. By the travel of the conveyer 2 in the direction indicated by the arrow in Fig. 1 the lap is delivered to the rolls 5 and 6, and by the rotation of the latter the lap is fed to the lap-conveyer in connection with which the folding operation is performed. In order to support the lap as it passes from the rolls 5, 6, to the said lap-conveyer, a short endless apron 7 is combined with the lower roll 6, such apron passing around the said roll and also around a supporting-roll 8 mounted in bearings in connection with fixed side-frames 9, 10, in position adjacent the receiving-portion of the lap-conveyer 11. This apron 7 travels in unison with the rotation of roll 6. It carries the lap from the roll 6 to the lap-conveyer, and delivers to the latter.

The lap-conveyer 11 advances the lap to be folded, and delivers the folded bat. It is an endless-apron conveyer, and is mounted upon rolls 12 and 13, the shaft 12$^a$ of the roll 12 being supported in bearings in connection with side-frames 9 and 10, and the roll 13 being journaled in bearings at the outer end of a conveyer-frame 14, the said conveyer-frame being supported at such end by upright posts 15. The roll 12 is conveniently rotated to cause the lap-conveyer 11 to move or travel in the direction indicated by the arrows near the same, in this instance through sprocket-connections 17, Fig. 2, and gearing 18, in connection with the lower roll 6 and the conveyer-apron 2.

The folding is effected by turning the leading portion of the lap backward upon the portion which follows, the operation being performed one or more times in connection with a bat, according as may be deemed advisable. The fly which is employed for thus turning the leading portion of the lap backward, comprises a rockshaft 19 and a series of fingers 20, 20, projecting from the said rockshaft. The rockshaft extends transversely of the path of the lap, below the said path. The fingers normally occupy a position below the lap, extending from the rockshaft in the direction of the travel of the lap. In the present instance, to accommodate the said fingers in their normal, depressed, position, the lap-conveyer 11 is composed of a series of narrow aprons or belts, which are located side by side upon the rolls 12 and 13 but separated from one another by spaces sufficient to admit the fingers 20, 20, between adjacent belts or aprons, and permit such fingers to play freely in and out. The fly has combined therewith the means for actuating the same at the required times. Such means consists, in the present instance, of an arm 21 that is fixed upon the fly rockshaft, a connecting-link 22 having one end thereof connected pivotally to the said arm, and a crank 23 mounted upon the shaft $12^a$ of roll 12, and with which the other end of said link is connected. The said crank stands normally at rest, in the position corresponding with the normal, lowered, position of the fly. It is loose upon shaft $12^a$. It has combined therewith a driving-clutch which normally is open, but which at the required times is tripped into action to bring about a rotation of the crank and one complete movement of the fly, the clutch thereupon opening to disconnect the crank from its actuating connections and leave the fly at rest in its normal lowered position again. The fly is called into action when the leading portion of the lap has been advanced by the lap-conveyer into position above the fly. As the fingers of the fly move upward, they take with them the said portion of the lap, and as they swing over backward from one dotted-line position in Fig. 1 to the other they bend the lap backward upon itself on a transverse line, as will be seen in Fig. 1. The fingers then are returned to their original position, where they remain at rest.

The support upon which the portion of lap that is turned back by the action of the fly is received consists in this instance of a table 24 arranged above the lap-conveyer 11. This table is mounted between the side-frames 9, 10, in a forwardly-slanting position, with its forward edge near the lap-conveyer. As the succeeding portion of lap in the rear of the line of the fold and resting on the lap-conveyer continues to advance with the lap-conveyer, the portion thrown or folded back in the manner just explained is drawn, or slides, down the inclined supporting table upon the succeeding portion. As soon as the folded-back portion has left the said table and the two thicknesses have been advanced to the proper point above the fly, the latter is again operated, with the result that the two thicknesses or folds are together thrown back upon the table. This is illustrated in Fig. 1. These thicknesses or folds are drawn off upon the top of the succeeding portion of the lap by the continuous advancing movement of the lap-conveyer, the turning-back or folding operation being repeated, and so on, until the machine has made the number of folds proper for the production of a bat of the required size.

The severing of the lap transversely when the required length thereof has passed on toward the folding point is effected, in this instance, by means of two sets of pins, 25, 26, carried by vertically-movable bars 27, 28. The said bars and their pins normally occupy positions which are, respectively, above and below the path of the lap on its way to the lap-conveyer. The bars are arranged to move vertically, and are guided in their movements up and down by their ends being fitted to vertical slots 29, 29, Fig. 1, in the side-frames 9, 10. The pins, 25, of the upper bar, 27, point downwardly, and the pins, 26, of the lower bar, 28, point upwardly, and the said pins slant in opposite directions so that when the bars are moved toward each other for the severing operation their paths intersect. In this movement of the bars the two series of pins enter the lap from opposite sides, and as they pass each other they tear the lap apart across its width. The two pin-bars are supported and actuated by being connected at their ends with sprocket-chains 30 which are mounted upon upper and lower sprocket-wheels 31, 32. One bar is attached to the length or run of each chain at one side of the said sprocket-wheels, and the other is attached to the length or run of such chain at the other side of said sprocket-wheels. Consequently, when the chains are caused to travel around the said sprocket-wheel the bars move oppositely relative to each other. The upper sprocket-wheels 31, 31, at the opposite sides of the machine are mounted upon studs 33 projecting from the respective side-frames 9, 10. The lower sprocket-wheels 32 are fixed upon a shaft 34 extending across the machine so as to insure movement of the two chains in unison. The toothed bars are held normally in their separated position shown in Figs. 1 and 3 of the drawings by means of contracting spiral springs $33^a$, each of which has one end thereof connected with one length or run of a sprocket-chain 30, and the other end thereof engaged with a fixed point $34^a$ on the floor. For the actuation of the bars at the proper time to sever the lap, the upper sprocket-wheel 31 at one side of the machine has fixed thereto a second sprocket-wheel, 35, upon which winds one end of a sprocket-chain, 36, the other end of which is attached to a lever 37. The said lever carries a roll 38 which is held by the action of the springs $33^a$ in contact with a cam 39 mounted loosely on shaft 12ᵃ. The said cam normally stands at rest in the position in which it is represented in Figs. 1 and 3. When it is caused to rotate in unison with the pulley 16, it acts against the roll 38 to depress lever 37, and the depression of such lever acts through chain 36, etc., to operate the chains 30 to move the toothed bars 27, 28, toward each other to part the lap, after which the parts are caused by the springs 33ᵃ to resume their positions in Figs. 1 to 3, and come to rest again. For its actuation, the cam 39 has combined therewith a driving-clutch, which normally is open, but which at the required times is tripped into action to bring about a rotation of the cam and one complete action of the lap-parting or severing devices, the clutch thereupon opening to disconnect the cam from its actuating connections, and leave the severing devices at rest in their normal open position again. The severing devices are called into action when the determined length of lap has passed the same on the way to the folding devices. As the toothed bars approach each other the two series of pins engage the lap from opposite sides and sever the same. The bars 27, 28, then are returned to their original position, where they remain at rest.

At 40, Figs. 1 and 3, is shown by a dotted circle, a rod or roll that is mounted in suitable supports within the machine. This rod or roll is mounted in such position that, as the bar 27 rises to its normal position after having been depressed for the lap-parting or severing operation, the pins thereof will approach the rod or roll and the latter will press off the points of the said pins any tufts of fibers clinging thereto.

The clutch-devices for the crank 23 and cam 39, and the means for controlling the said clutch-devices and determining the times of action of the folding and severing devices are as follows: The crank 23 is furnished with a sleeve 231 fitting the shaft 12ᵃ between the hub of band-pulley 16 (which runs loose upon shaft 12ᵃ) and a collar 232 set-screwed upon the outer end of such shaft. Upon the said sleeve is mounted a clutch-hub 233, splined to the sleeve so that the two must turn in unison but movable lengthwise thereon. An expanding spiral spring 234 contained in a counter-bore of the said clutch-hub is compressed between an internal shoulder of the clutch-hub and one side of the crank-arm. Such spring acts with a tendency to move the clutch-hub toward the band-pulley 16 and cause the teeth of such clutch-hub to enter notches in the adjacent face of the pulley-hub. Similarly, cam 39 is furnished with a sleeve 391 fitting the shaft 12ᵃ between the hub of band-pulley 16 and a collar 392 set-screwed upon shaft 12ᵃ. The sleeve 391 has splined and movable lengthwise thereon a clutch-hub 393 with contained expanding spiral spring 394 compressed between an internal shoulder of the said clutch-hub and one side of cam 39, such spring acting with a tendency to move the clutch-hub toward the band-pulley and cause the teeth of the clutch-hub to enter notches in the corresponding face of the pulley-hub. When either clutch-hub is permitted to move toward the band-pulley 16 under the action of its spring, the engagement of such clutch-hub with the band-pulley causes the crank or the cam, as the case may be, to rotate in unison with the band-pulley. Such rotation in unison is permitted, however, only to the extent of one turn of the band-pulley. The engagement of the respective clutch-hubs with the band-pulley is controlled, and the clutch-hub which at a given time is in engagement with the band-pulley is disengaged from the latter at the end of one turn or revolution therewith, by automatic devices. Such automatic devices include, for the clutch-hub of the crank 23, a tripping-lever 41 sleeved loosely upon rockshaft 19, a cam 42 on said tripping-lever, and a pin 43 projecting radially from clutch-hub 233; and, for the clutch-hub of the cam 39, a tripping-lever 44 sleeved loosely upon the said rockshaft, a cam 45 on said tripping-lever, and a pin 46 projecting radially from clutch-hub 393. Also, a rotating wheel 47, bearing projections 48, 49, on its opposite sides, and operatively combined with the lower roll, 6, so as to rotate in a predetermined ratio with respect thereto. Such wheel 47 is mounted to turn upon a stud 50 projecting from side-frame 9, and in this instance it is combined with roll 6 by being formed as a spur-gear and caused to mesh with a spur-pinion 51 fixed on one journal of the said roll. Tripping-lever 41 is furnished with a toe-piece that lies and overhangs the path of the projections 48 extending from one face of wheel 47. Tripping-lever 44 is furnished with an extension that overhangs the path of the projection 49 extending from the other face of the said wheel. The tripping-levers gravitate toward the clutch-hubs 233 and 393. The cams 42 and 45 of such levers have outwardly beveled leading ends, and straight outer sides in continuation of the inclines of the said ends. When either tripping-lever is raised by a projection of the wheel 47, its cam is lifted above the radial pin of the corresponding clutch-hub, and the latter is left free to be moved inward by its spring into engagement with the band-pulley. Thereby the said clutch-hub and connected cam or crank is caused to rotate in unison with the band-pulley. When the continued turning movement of wheel 47 carries the projection away from under the tripping-lever, the latter is permitted to drop and carry the cam thereof into the path of the radial pin of the said clutch-member. As the said pin comes around and encounters the inclined leading end of the cam, the pin will be deflected outward along the incline, thereby moving the clutch-hub so as to disengage it from the band-pulley, the disengagement being complete by the time the pin passes from the incline of the cam to the outer side of the latter, so that the clutch-hub and connected crank or cam come to rest with the pin engaged with the said outer side.

In the drawings the wheel 47 is shown equipped with three projections 48, 48, 48, to indicate a corresponding number of folding operations, and with a single projection 49 to indicate a severing or parting operation in proper relation to the third fold. An interval on the said wheel succeeding the third projection 48 allows the folding device to remain inoperative while the folded bat is carried away by the lap-conveyer 11 and allowed to fall from the outer end of the latter upon the table 55, and until the required amount for the first layer or fold of the next ensuing bat is carried forward into position to be acted upon by the said device. From table 55 the bat is taken by a workman and folded several times at right angles to its primary folds, or rolled, so as to reduce it to convenient size for being handled and for storage or shipment.

What is claimed as the invention is:

1. A machine for making bats comprising, in combination, means for forming and feeding a lap of fibrous material, means for folding the lap upon itself in elongated folds as it is fed along, and means for severing the lap in direction corresponding with the lines of fold into bat-lengths.

2. A machine for making bats comprising, in combination, means for feeding a lap of fibrous material, means for folding the lap upon itself on transverse lines into a folded bat, and means for severing the lap into bat-lengths.

3. In combination, a moving conveyer, means for folding the material carried by the said conveyer back upon itself as it is advanced, and means for separating the material into lengths on its way to the folding means.

4. A machine for making bats, comprising, in combination, a conveyer to feed the lap, lap-severing devices, and a fly which folds the lap upon itself by turning the foremost portion thereof back upon that which follows.

5. In combination, a lap-conveyer, means for turning back the leading portion of the lap, and a support upon which such portion is received and from which it is delivered upon the succeeding portion on the conveyer.

6. In combination, a lap-conveyer, means for turning back the leading portion of the lap, a support upon which such portion is received and from which it is delivered upon the succeeding portion on the conveyer, and means for separating the lap into lengths on its way to the said turning-back means.

7. In combination, a conveyer to feed the lap, a fly which folds the leading portion of the lap back, and a lap-support upon which such portion is received and from which it is delivered to the conveyer again.

8. A machine for making bats comprising, in combination, a conveyer to feed the lap, a fly which folds the leading portion of the lap back, a lap-support upon which such portion is received and from which it is delivered to the conveyer again, and means for dividing the lap into bat-lengths.

9. In combination, a conveyer to feed the lap, means to fold the leading portion of the lap back, and a lap-support above and inclined toward the said conveyer, upon which such portion is received, and from which it is delivered to the conveyer again.

10. In combination, a conveyer to feed the lap, means to fold the leading portion of the lap back, a lap-support above and inclined toward the said conveyer, upon which such portion is received, and from which it is delivered to the conveyer again, and means for separating the lap into bat-lengths.

11. In combination, means to supply a continuous lap, a conveyer receiving the said lap, means to form successive folds in the lap by turning the foremost portion thereof back upon that which follows, and means for severing the leading bat-length from the said lap.

12. In combination, means to supply a continuous lap, a conveyer receiving the said lap, a fly which folds the lap upon itself by turning the foremost portion thereof back upon that which follows, and means for severing the leading bat-length from the said lap.

In testimony whereof I affix my signature in presence of two witnesses.

CHARLES E. T. SCRIBNER.

Witnesses:
CHAS. F. RANDALL,
EDITH A. WISEMAN.